May 11, 1926.
H. H. SUPLEE
1,584,200
PRIME MOVER
Filed May 8, 1920
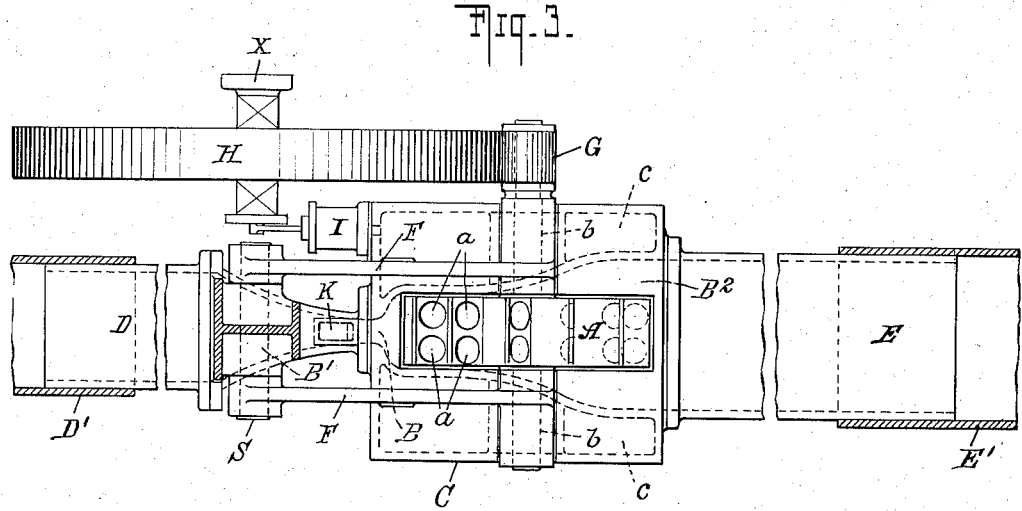
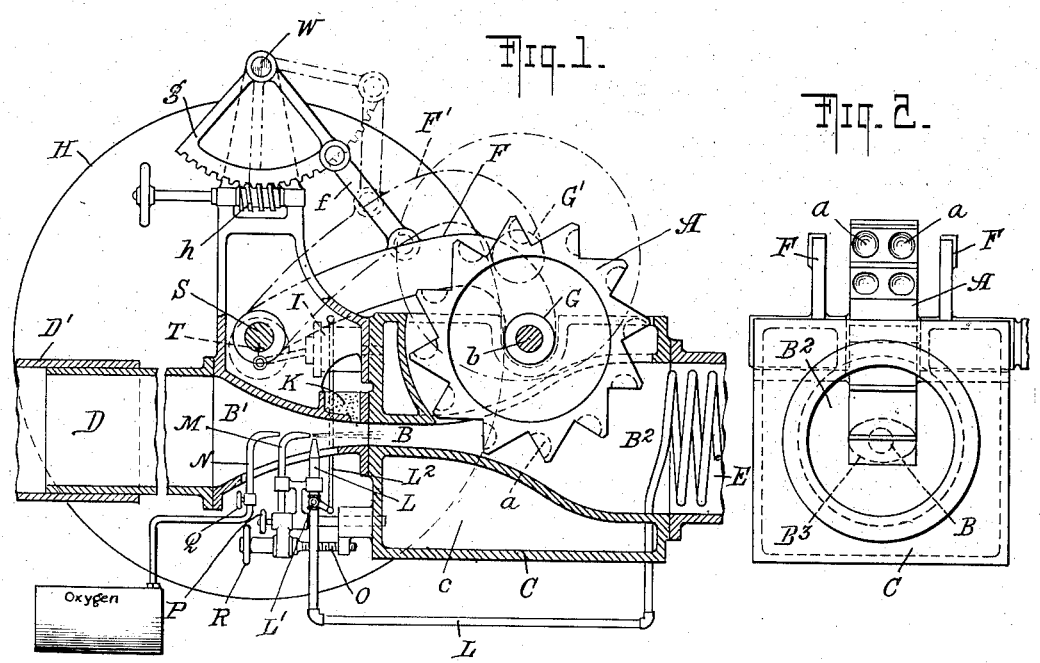
WITNESSES
INVENTOR
HENRY H. SUPLEE
BY
ATTORNEYS Patented May 11, 1926.

1,584,200

UNITED STATES PATENT OFFICE.

HENRY H. SUPLEE, OF NEW YORK, N. Y.

PRIME MOVER.

Application filed May 8, 1920. Serial No. 379,692.

My invention relates to that class of prime movers in which a receptive element such as a rotor, a rotating member or other reacting abutment is operated by the impulse and pressure of gases of combustion, these gases consisting of the highly heated products of the combustion of gaseous, liquid or solid fuel, together with the heated air and non-combustible gases which may be associated with them; and more particularly, to the type of prime movers commonly called gas-turbines.

It has already been demonstrated that gas-turbines can be made as operative machines, but in most instances the amount of resistance or negative work produced by the preliminary compression of air and fuel, or both, is so considerable that the net amount of power available for useful work is proportionately small. It is the object of one portion of my invention so to diminish the amount of hurtful resistance, or negative work, as to leave a large proportion of the power derived from the combustion of the fuel available for external useful work.

It is also an object of my invention to recover, from the rejected heat, a considerable portion of the energy which would otherwise be wasted, and thus to increase the net thermal and mechanical efficiency of the motor.

It is also an object of my invention to provide effective means for governing or regulating the speed and power of the machine in a manner which shall bring it under control in this respect, and enable the starting and stopping of the motor to be simply and practicably effected.

It is also the object of my invention to provide for the cooling of the rotor, which is necessarily exposed to the high temperature of the products, and to reduce the injurious effects which such high temperatures might otherwise produce.

In general, my invention consists in the employment of a comparatively small volume of compressed air, preferably highly heated to deliver an atomized or pulverized jet of fuel, either liquid, solid or gaseous, into a special form of nozzle, this nozzle forming an induction jet air-pump which delivers the greater part of the air required for combustion, and embodying also a contracted throat in, and closely beyond which the combustion takes place, the gases passing on through an expanding portion of the nozzle where the heat energy is converted into kinetic energy, and delivered to a receptive element such as a rotor or wheel. The nozzle thus performs all the functions of air-compressor, combustion-chamber, and expansion-chamber. Since the amount of air required for the fuel feed-jet is small, it requires a correspondingly small amount of power to compress it. I prefer to deliver this air through a space highly heated by the heat rejected from the nozzle, thus increasing its volume and pressure, and effecting a substantial saving in power, and, incidentally permitting or facilitating the use of viscous fuels. The heat energy released by the combustion of the pulverized fuel in intimate mixture with the correct amount of air, at the point where the expanding dimensions of the nozzle begin, causes a high velocity to be produced in the discharge of the gases through the nozzle. The rotor or wheel is placed in the expanding nozzle in such a manner that both the impulse of the swiftly moving gases and the pressure produced in the expanding nozzle act upon the blades or buckets of the wheel, causing it to revolve at a high rate of speed, a large proportion of the kinetic energy of the gases being thus transferred to the wheel and made available for external use, with but a small amount of negative work to be deducted for the operation of the fuel feed.

Referring to the drawings, Figure 1 represents a longitudinal section of a machine, embodying my invention, and showing the nozzles in section, and the rotor, or wheel unsectioned, as if placed in the midst of the sectioned nozzle. Fig. 2 shows an end elevation, and Fig. 3, a plan view. It is understood that these drawings are schematic, and do not purport to give the precise dimensions of the various parts, but only the general arrangement.

Referring to Fig. 1, A represents the rotor, or revolving member of the machine, mounted on a shaft $b$—$b$; this rotor being placed so that a portion of its circumference lies within the compound nozzle B¹—B—B², the wheel or rotor actually being in the expanding portion of the nozzle B². The construction of the rotor is shown in the drawings, the perimeter being cut into notches or teeth, as shown, these teeth being at such an angle that the tooth which is in the middle of the expanding nozzle has its face practically at right angles to the axis of the nozzle.

On the face of each tooth there are formed or milled preferably, two hemispherical or otherwise laterally curved cups or buckets, a—a, side by side, to receive and reverse the impinging gases. By making the rotor in this manner, a highly efficient form of wheel is produced by accepted and practical machining operations, while retaining the full strength of the material; a construction preferable to that involving the use of separate and attached blades.

The compound nozzle is formed primarily of three portions, the narrow throat or neck B, the converging portion B¹, and the expanding portion B². To these may be added the air intake pipe D, and the exhaust pipe E.

The throat B, and expanding nozzle B² may be formed by casting or otherwise in a casing or jacket C. This jacket is shown rectangular in section in the drawings, but I do not limit myself to any particular form for the exterior casing, the essential feature of this jacket being its relation to the nozzle B—B² so that it may receive heat from the combustion and heated gases in the nozzle, and thereby act to transfer a portion of the heat, not converted into kinetic energy, to air which may be in the space around and in proximity to the nozzle B—B².

The converging portion of the nozzle B¹, may be round in cross section, and the narrow throat expands laterally into an elliptical section, as shown at B³ in Fig. 2 and Fig. 3, to a width slightly greater than the width of the rotor A, and this elliptical section gradually merges into a circular cross section at its junction with the exhaust pipe E. The use of this form of expanding nozzle permits the discharge of rapidly flowing gases from the circular contracted nozzle upon the portions of each pair of hemispherical buckets or cups a—a nearest the axis of the jet of gases, that is to say, upon the adjoining portions, while the change to the elliptical section affords space for the gases to expand as the direction of their flow is reversed in the cups or buckets. The further enlargement of the nozzle B into the circular section and trumpet-shaped mouth permits the free expansion of the heated gases moving with the rapidly revolving rotor.

In the converging nozzle B¹, approaching the contracted portion B, is placed an atomizer or fuel pulverizer, composed of an air-jet tip M, and fuel-supply tip L. The air-tip M, of the fuel-pulverizer communicates with the hot-air reservoir space C—C around the compound nozzle B—B², the flow of air being regulated by a valve P, and the entire fuel pulverizer being provided with means for adjustment axially in the nozzle B¹, such means for adjustment, as shown in Fig. 1, being a screw O, and hand-wheel R. The provision of means for adjusting the fuel pulverizer or atomizer and injector relatively to the contracted portion of the compound nozzle B—B² is of the utmost importance in order that the fuel combustion may take place at the proper point to secure the maximum efficiency. If the combustion were to occur too soon or rather not far enough in the contracted portion, the gases would be blown rearwardly instead of forwardly, while if the combustion were to occur too far forward in the contracted portion, the maximum available effect of the expansion of the gases would be lost. Furthermore, the provision of the adjusting means is important to enable the point of combustion to be varied in order that changes due variation in atmospheric or fuel conditions may be compensated for. The fuel-pipe L of the pulverizer may be connected with a source of supply fed either by gravity or other pressure, and may be connected to more than one source of fuel supply, so that the character of the fuel fed to the pulverizer may be changed while the machine is in operation.

At N is an auxiliary jet tip, with valve Q, and pipe connection, by means of which oxygen may be delivered into the nozzle while the machine is in operation, as is explained hereinafter.

At K, is a hopper or similar connection, through which finely-divided, or powdered, solid fuel, such as coal-dust, coke-breeze, or similar finely-divided fuel may also be fed into the nozzle B, at will.

The rotor A, is mounted in bearings carried on arms F—F, these arms being hinged or pivoted on a centre S, in such a manner that when the arms F—F are raised the rotor A will be lifted partially or completely out of the nozzle B—B². The means for raising the arms F—F and rotor A, shown in the drawing consist of a link f, sector g, worm h, and hand-wheel k; the sector g being pivoted on a support at W, and provided with teeth engaging with the worm h. When the various parts are in the position shown in the solid lines in Fig. 1, the rotor A is in full working position in the nozzle B—B²; when the parts are in the position shown in the dotted lines, the rotor A is raised entirely out of the nozzle B—B². It is evident that the rotor A may be in any intermediate position between these two extremes. It will be seen that when the rotor A is in the lowermost position, as shown by the solid lines, the link $f$, the sector $g$ form a straight-line strut, holding the rotor firmly in position, and that the sector $g$ and link $f$ form a toggle-joint connection between the arm F and pivot W. If desired, provision may be made for automatically reducing the amount of fuel fed when the rotor is lifted out of the path of the current of gases. As conventionally indicated, this is done in the structure illustrated by means of a valve $L^1$ in the fuel supply pipe and a link $L^2$ connecting it with the rotor support F. The valve is thus partially closed as the rotor is raised, and opened as the rotor is lowered.

On the end of the rotor shaft is a friction pinion G, Fig. 3, shown in Fig. 1 and Fig. 3 in rolling friction contact with a friction-driven wheel H, this combination forming a speed-reduction device to bring the high rotative speed of the turbine rotor down to a slower rotative speed for utilization; and on the end of the shaft of this friction wheel H, is a coupling X, this being the point where power may be taken off to perform useful work.

Referring to Fig. 1, it will be seen that the arms F are hinged to a centre S, while the friction wheel H has its centre of rotation at T. The effect of this difference of centres is gradually to draw the friction-pinion G out of contact with the friction-wheel H, as the arms F and rotor A are raised. In Fig. 1, the dotted position of the parts, in which the arm F is indicated as $F^1$, and the friction-pinion G as $G^1$, shows that the pinion G is gradually moved out of contact with the wheel H, as the arm F is raised; and, conversely, the pinion G is gradually brought into contact with the wheel H as the arm F is lowered.

By this means it is possible to control the action of the jet of gases upon the rotor A, by lifting it to a greater or less degree out of the path of the gases, and at the same time to release the driving contact of the friction wheels.

In starting the machine, it is therefore possible to start the combustion of fuel and flow of gases through the nozzle while the rotor is entirely out of the nozzle; and when the combustion is fully established the rotor may be gradually lowered into the current of swiftly-moving gases, and at the same time the friction transmission system is brought into action.

At I is an air-pump, shown as driven from the friction-wheel H, but which may be driven from any convenient portion of the mechanism, this pump delivering air into the chamber of jacket C—C around the nozzle B—B.

The intake air-pipe D, and exhaust-pipe E may be of any convenient length, the inertia of the air and gases in these pipes having a tendency to steady and equalize the flow through the nozzle, and prevent back-firing.

The machine hereinabove described is illustrative only, it being obvious that many changes of construction and arrangement can be made, without departing from the principles herein disclosed. For instance, the rotor, while preferably made of one piece, may be built up of several parts, and its form may be varied within wide limits; any suitable form of liquid-fuel pulverizer may be used in place of the fuel-pulverizer illustrated; and any other suitable means for raising and lowering the rotor may be used in place of the means shown. In fact, the principles of my invention may be embodied in machines or apparatus quite different from the machine illustrated, for instance in machines other than gas turbines, as it is obvious that the kinetic energy made available by my invention, may be applied to any element receptive of the reaction of the discharge. Samples of such applications appear in the direct propulsion of a vehicle on the surface of the land, or of the water, or in the air. The performance of the nozzle is not dependent upon the direction of its axis, or any particular form of cross-section.

The operation of the machine is as follows:

Fuel being delivered to the pulverizer at L, and compressed air delivered through the tip M, and the fuel being ignited by any convenient means, the result is a jet of burning fuel directed into the contracted portion B of the nozzle. The amount of air delivered by the tip M being only sufficient to pulverize the fuel and originate combustion, there is an excess of fuel present at the convergence of the nozzle B.

The induced air current, drawn in the converging nozzle $B^1$, meets this excess of fuel, in the presence of the already ignited jet, and provides an ample amount of air for the complete combustion of the entire flow of pulverized fuel. This combustion, which is carried on in the contracted portion of the nozzle, and on into the expanding portion of the nozzle $B^2$, by reason of the great increase in volume, due to the heat of combustion and the production of gases from the burning fuel, produces a powerful rush of swiftly-moving gases through the nozzle B—$B^2$, and a consequent inrush of air through the intake pipe D and nozzle $B^1$. The apparatus should be arranged and operated by properly adjusting the position of the jet M and associated parts to project the fuel in such a manner that the expanding gases will find their outlet of minimum resistance in the desired direction.

The air-pump I supplies a small quantity of cold air to the jacket C—C, but the intense heat in the nozzle B¹—B—B² heats this air, and adds to its pressure, so that the increased volume of the air thus heated is ample to maintain the action of the pulverizing jet M. For this reason, in my invention, the amount of negative work required for the operation of the air-pump I is insignificant in comparison with that which would be required to furnish all the air demanded for complete combustion of the fuel.

The suction which draws the greater volume of air required for combustion through the converging portion B¹ of the nozzle, is caused by the velocity due to the expansion of the gases of combustion in the diverging portion B² of the nozzle.

The rapid expansion of the heated air and gases in the expanding nozzle B², together with the impulse action of the emerging jet of gases from the contracted nozzle B upon the buckets of the rotor A, converts the thermal energy released by the combustion of the fuel into kinetic energy upon the wheel or rotor A, which thereby attains a high rotative speed, which, reduced by the friction pinion G and wheel H, may be wholly utilized for external purposes, less the small amount required to drive the air-pump I, which feeds the fuel jet.

If any deposits of carbon form upon the interior of the nozzles or on the rotor, this deposit may be removed while the machine is running, by delivering a jet of oxygen gas, from a cylinder or tank of compressed gas, through the auxiliary tip N. Since this operation is but rarely required, and takes but a few minutes, the cost of the operation is slight, and it is readily performed.

It is evident that my invention of utilizing the heat conducted and radiated from the combustion nozzle for the production of the air-pressure for the fuel-feed may be employed for turbine wheels of other types than that shown in the drawing, and I do not limit myself to wheels of the type shown. It is, however, desirable to have a portion of the wheel at all times moving through free external air, and to limit the part of the wheel exposed to the high temperature to as small a portion of the perimeter as practicable, in order to avoid overheating of the rotor.

It may be found more convenient to start the operation of the cold machine with some of the more volatile hydrocarbons, such as gasoline. This obviously could be done, without changing the construction shown, by merely circulating such more volatile hydrocarbon through the coil E to the fuel supply L. After the temperature of the machine is raised sufficiently, the operation is carried on by the substitution for the more volatile fuel of a heavier material, such as fuel oil, which is readily atomized by the blast of highly heated air.

After the machine is in full operation the fuel may easily be enriched by feeding finely powdered solid fuel into the flame, through the funnel K, the temperature and proportion of air being ample for the combustion of such powdered fuel in combination with a liquid fuel.

In order to avoid the resonance effect which would be produced, in accordance with the well known laws of harmonics, should the vibrations of the flame produced in the tubular conduit be attuned to the vibration frequency of the conduit, I prefer to make provision for varying the lengths of the combustion tube from the jet to both open ends thereof, to permit adjustment in operation. This is done in the structure illustrated by making the inlet and outlet portions of the tube telescopic, as shown at D¹, E¹, in Fig. 3.

It is to be noted that a considerable variety of fuels may be used in a power generator, in accordance with the present invention. Liquid fuel, such as the heavy oils, may, for example, be used either with or without pre-heating. Preferably, heavy oils, when used, are pre-heated as in a coil placed in heat exchange relation to the hot exhaust gases.

I claim:

1. As a power generator, a tubular chamber comprising a relatively contracted portion and a relatively expanded portion, in combination with means for injecting fuel axially into such contracted portion towards such expanded portion, including an air blast, and said chamber being provided with an aperture to permit the entrainment of an additional air supply through said conduit by the inductive effect of the fuel injection means, substantially as described.

2. As a power generator, a tubular chamber comprising a relatively contracted portion and a relatively expanded portion, in combination with means for injecting fuel axially into such contracted portion towards such expanded portion, including an air blast, and said chamber being provided with an aperture to permit the entrainment of an additional air supply through said conduit by the inductive effect of the fuel injection means, and a movable element located within the path of and operated by the current of the gases of combustion passing through said chamber, substantially as described.

3. As a power generator, a tubular chamber comprising a relatively contracted central portion between two relatively expanded portions, in combination with means for injecting fuel axially into such contracted portion, including an air blast, and said chamber being provided with an aperture to permit the entrainment of an additional air supply through said conduit by the inductive effect of the fuel injection means, substantially as described.

4. As a power generator, a tubular chamber comprising a relatively contracted central portion between two relatively expanded portions in combination with means for injecting fuel axially into such contracted portion, including an air blast, and said chamber being provided with an aperture to permit the entrainment of an additional air supply through said conduit by the inductive effect of the fuel injection means, and a movable element located within the path of and operated by the current of the gases of combustion passing through said chamber, substantially as described.

5. As a power generator, a tubular combustion chamber consisting of a nozzle having a central relatively contracted portion gradually expanding in both directions into relatively larger portions, in combination with means for injecting fuel axially into such contracted portion, including an air blast, and said chamber being provided with an aperture to permit the entrainment of an additional air supply through said conduit by the inductive effect of the fuel injection means, and a movable element located within the path of and operated by the current of the gases of combustion passing through said chamber, substantially as described.

6. In a gas turbine, a tubular conduit, means for producing a continuous current of gases through said conduit, a movably mounted rotor adapted to project into said conduit and the path of the current of gases passing therethrough, and means for moving said rotor laterally out of said conduit and said current of gases to vary the driving effect produced by said gases on said rotor.

7. In a power generating device, the combination with means for producing a current of gases, of a turbine wheel movable into the path of said current of gases, a friction wheel mounted to rotate with said turbine wheel, a second friction wheel cooperating therewith and a pivoted support for said turbine wheel pivotally mounted on an axis eccentric to said driven friction wheel, whereby the driving friction wheel will be moved out of engagement with the driven friction wheel as the turbine wheel is moved from the path of the current of gases, and whereby said wheels are caused to engage as the turbine wheel is moved into engagement with the current of gases, substantially as described.

8. As a power generator, a tubular combustion chamber comprising a relatively contracted portion and a relatively expanded portion, in combination with means for injecting fuel axially into such contracted portion towards such expanded portion, including an air blast, and said chamber being provided with an aperture to permit the entrainment of an additional air supply through said conduit by the inductive effect of the fuel injection means, such means comprising a heat transfer jacket surrounding a portion of the combustion chamber, a jet in communication with said jacket and a pump arranged to force fluid into said jacket, substantially as described.

9. Apparatus as defined in claim 1 in which the tubular chamber is of adjustable length, for the purpose of preventing vibrations of the fluid column therein due to resonance.

10. As a power generator, a tubular chamber comprising a relatively contracted portion and a relatively expanded portion, in combination with means for injecting liquid fuel axially into such contracted portion towards such expanded portion, including an air blast, and said chamber being provided with an aperture to permit the entrainment of an additional air supply through said conduit by the inductive effect of the fuel injection means, and with means for preheating the fuel comprising a coil in heat exchange relation to the exhaust gases, substantially as described.

11. As a power generator, a tubular chamber comprising a relatively contracted portion and a relatively expanded portion in combination with means including an air blast for injecting fuel axially into such contracted portion towards such expanded portion, said chamber being provided with an aperture to permit the entrainment of an additional air supply through said aperture by the inductive effect of the fuel injection means, a movable element located within the path of and operated by the current of the gases of combustion passing through said conduit, means for moving said element toward and from said path, and means inter-connected with said last named means for automatically varying the supply of fuel in accordance with the movement of said element toward or from said path.

12. As a power generator, a tubular conduit having a contracted portion to provide an ignition chamber, and a relatively expanded portion to provide a combustion chamber, in combination with means including an air jet, to inject fuel axially into such contracted ignition chamber towards such expanded combustion chamber, said means also including a jacket spaced from the walls of said ignition and combustion chambers and forming therewith an air reservoir, and means to connect said reservoir with said air jet; the temperature of the air within said reservoir being raised by the heat of the fuel combustion within said conduit to cause an increase in the pressure of said air.

13. In a power generator, a tubular chamber comprising a relatively contracted central portion and a relatively expanded portion, means for injecting fuel axially into such contracted portion towards such expanded portion, said means including an air jet and a fuel injection nozzle and means for moving said air jet and fuel injection nozzle longitudinally of said tubular chamber, to vary the position of such air jet and fuel nozzle relatively to said contracted portion.

HENRY H. SUPLEE.